F. & F. A. BLOCKI.
WINDROWER.
APPLICATION FILED MAY 25, 1910.
1,037,418.
Patented Sept. 3, 1912.
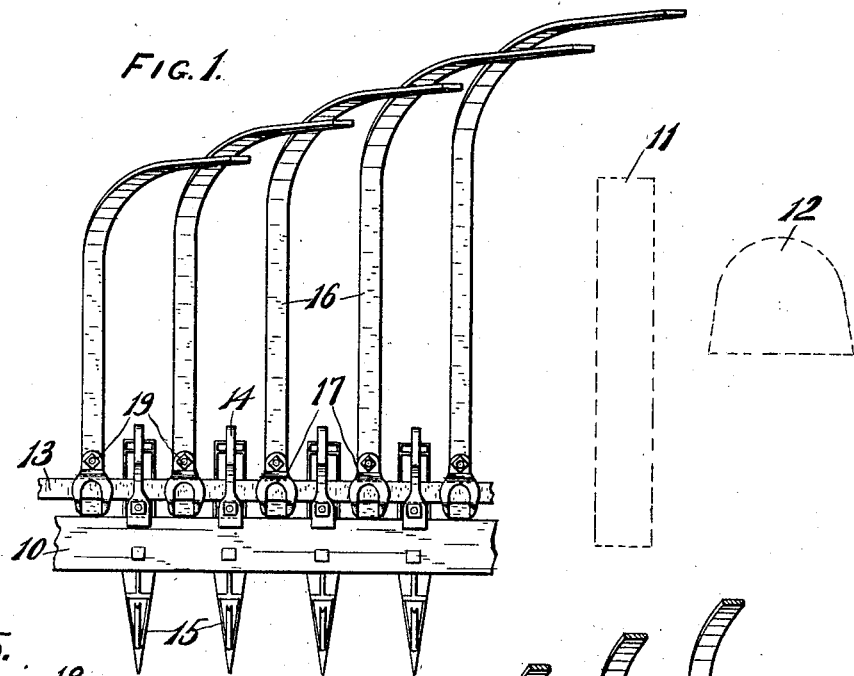
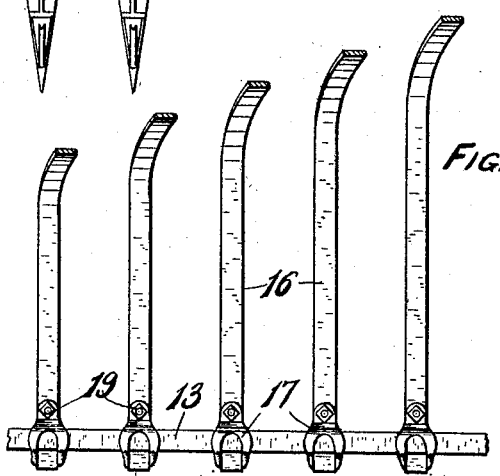
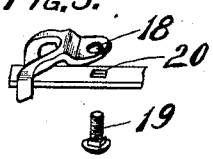
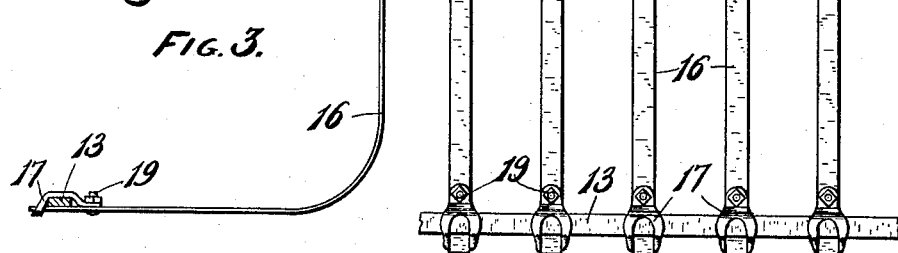
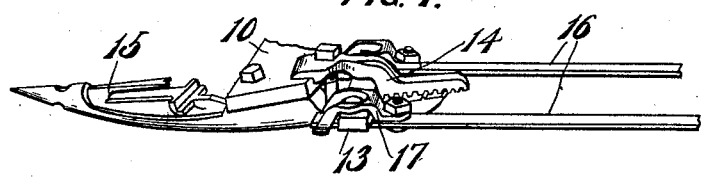

UNITED STATES PATENT OFFICE.

FRANZ BLOCKI AND FRANK A. BLOCKI, OF SHEBOYGAN, WISCONSIN.

WINDROWER.

1,037,418.     Specification of Letters Patent.     Patented Sept. 3, 1912.

Application filed May 25, 1910. Serial No. 563,277.

*To all whom it may concern:*

Be it known that we, FRANZ BLOCKI and FRANK A. BLOCKI, residing in Sheboygan, in the county of Sheboygan and State of Wisconsin, have invented new and useful Improvements in Windrowers, of which the following is a description, reference being had to the accompanying drawings, which are a part of this specification.

This invention has for its object to provide a windrower for harvesting machines which will be composed of rods extending rearwardly from the cutter bar and bent upwardly and laterally toward the driver, without being twisted so as to present their flat faces toward the driver, thus offering sharp edges as contact surfaces for the cut material and thereby more effectively moving the material to the side to form the windrow.

Another object of the invention is to provide the rods with a clip of novel construction for clamping their front ends to the cross bar.

With the above and other objects in view the invention consists in the windrower herein claimed, and all equivalents.

Referring to the accompanying drawings in which like characters of reference indicate the same parts in the different views: Figure 1 is a plan view of a portion of a windrower constructed in accordance with this invention; Fig. 2 is a similar view with the rods sectioned at their bends to show that their faces remain parallel with the cross bar; Fig. 3 is a side elevation of one of the rods of the windrower, showing the absence of twist therein; Fig. 4 is a perspective view showing the connection of the windrower to the cutter bar; and, Fig. 5 is a perspective view of the end of the windrower rod with the clip unfastened.

In these drawings 10 indicates the cutter bar of a harvester, the position of the driving wheel and the driver's seat being indicated in dotted lines at 11 and 12 respectively, and 13 is the ordinary cross bar connected with the clamps 14 of the finger guards 15 in the usual manner. The windrower rods 16 are flat and connected to the cross bar 13 by means of clips 17 which are open at one end to receive the end of the windrower rods 16 and are arched over the cross bar 13 with an opening 18 in the other end to receive a bolt 19. The bolt is preferably provided with a square shoulder to fit within a square opening 20 of the windrower rod to prevent its turning. When the bolt 19 is passed through the openings 20 and 18 and its nut is turned thereon the clip 17 swings on its looped end as a fulcrum and tightly clamps the cross bar 13 between it and the end of the windrower rod. The rear ends of the windrower rods are bent upwardly and at an incline toward the seat of the driver at distances from the cross bar successively increasing as the driver's seat is approached to collectively produce the effect of a rounded deflecting wall in an oblique position with relation to the cutter bar.

As flat windrower rods have heretofore been made, they have received a twist at their bends which causes their flat faces to be directed toward the driver's seat and consequently they present a smooth face to the material as it moves along the oblique deflecting wall, but by this invention the rods being kept under restraint during their bending so as to prevent such twisting have their sharp edges presented to the material so as to more effectively feed the same to the windrow, such edges serving as the threads of a screw for advancing the material to the discharge end of the windrower as it is rolled over and over by the stubble beneath it.

As shown in Figs. 2 and 3 the windrower rods when viewed in the direction of the cross rod are bent upwardly and laterally without twisting, but stand in such a position that horizontal cross sections thereof at any point will show that the faces of the rods remain parallel to the cross bar. Inasmuch as the material lies oblique to the direction of travel of the machine and to the cross bar its contact with the windrower rods is only along the front edges thereof which are nearest the driver's seat, so that each windrower rod has a knife edge engagement with the material which will more effectively produce the screw thread action thereon to advance the material to the discharge side of the windrower.

What we claim as new and desire to secure by Letters Patent is:

1. A windrower, comprising flat rods, arched clips with openings at one end fitting over the ends of the rods, bolts passing through the rods and the other ends of the clips, and a cross bar clamped between the clips and the rods, said rods being bent upwardly and laterally at successively greater distances from the cross bar to collectively produce an oblique deflector for cut material.

2. A windrower, comprising parallel flat rods, arched clips having openings at their ends receiving the ends of the rods, bolts passing through the rods and the other ends of the clips, a cross bar clamped by the bolts between the clips and the rods, said rods having their rear ends bent upwardly and laterally without twisting whereby they collectively form a deflector for cut material oblique with relation to the cross bar and present a single edge for engagement with the cut material to lead it to one side.

3. A windrower, comprising flat windrower rods, and a cross bar to which the rods are connected, said rods being bent upwardly and inclined laterally at successively greater distances from the cross bar without being twisted, the inclination of each rod being sufficient to carry it above the next rod whereby they collectively produce a deflector for material oblique with relation to the cross bar and each presents a single inclined edge for the engagement with the material with its flat face turned directly toward the cross bar.

In testimony whereof, we affix our signatures, in presence of two witnesses.

FRANZ BLOCKI.
FRANK A. BLOCKI.

Witnesses:
ELSIE LOEBEL,
OLIVE H. ALBERS.

Copies of this patent may be obtained for five cents each, by addressing the "Commissioner of Patents, Washington, D. C."